United States Patent
Fujimoto (10) Patent No.: US 7,680,845 B2
(45) Date of Patent: Mar. 16, 2010

(54) CONTENTS DELIVERY SYSTEM AND NETWORK SERVER

(75) Inventor: Munehiko Fujimoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 284 days.

(21) Appl. No.: 11/760,317

(22) Filed: Jun. 8, 2007

(65) Prior Publication Data
US 2007/0294315 A1 Dec. 20, 2007

(30) Foreign Application Priority Data
Jun. 14, 2006 (JP) .............................. 2006-164839

(51) Int. Cl.
*G06F 17/30* (2006.01)
(52) U.S. Cl. ...................... 707/204; 709/105; 709/218; 709/234
(58) Field of Classification Search ....................... None
See application file for complete search history.

(56) References Cited

U.S. PATENT DOCUMENTS

| 6,081,840 A * | 6/2000 | Zhao .......................... 709/224 |
| 6,223,206 B1 * | 4/2001 | Dan et al. .................... 718/105 |
| 2006/0168104 A1 * | 7/2006 | Shimizu et al. ............. 709/218 |
| 2006/0212516 A1 * | 9/2006 | Shikatani ..................... 709/205 |
| 2008/0046587 A1 * | 2/2008 | Sakoh et al. ................. 709/234 |

FOREIGN PATENT DOCUMENTS

| JP | 2004-120038 A | 4/2004 |
| JP | 2006-501751 A | 1/2006 |
| WO | WO 2004/032515 A1 | 4/2004 |

* cited by examiner

*Primary Examiner*—Charles Rones
*Assistant Examiner*—Yuk Ting Choi
(74) *Attorney, Agent, or Firm*—Crowell & Moring LLP (57) ABSTRACT

A contents delivery system including a network player and plural network servers. When the network player transmits a contents acquisition requirement to one of the network servers, the network server detects a CPU load, and when the CPU load is judged to exceed a CPU load threshold, the network server judges whether contents which the network player requires to acquire were copied to any of network server. When the contents are judged to have been copied, the network server obtains from a HDD not only a contents URI corresponding to the copied contents but also a server ID corresponding to the network server in which the contents were copied and subsequently transmits the contents URI and the server ID to the network player. The network player a contents acquisition requirement to obtain contents, which corresponds to the contents URI, to the network server, which corresponds to the server ID.

4 Claims, 6 Drawing Sheets

| NAME OF CONTENTS | 44.mp3 | 100.jpg | ABC.mpg |
|---|---|---|---|
| NUMBER OF ACCESS | 50 | 12 | 22 |
| SERVER ID | - | - | - |
| CONTENTS URI | - | - | - |

FIG.8

| NAME OF CONTENTS | 44.mp3 | 100.jpg | ABC.mpg |
|---|---|---|---|
| NUMBER OF ACCESS | 51 | 12 | 22 |
| SERVER ID | 3 | - | - |
| CONTENTS URI | http://server3/44.mp3 | - | - |

FIG.9

| NAME OF CONTENTS | 30.mp3 |
|---|---|
| NUMBER OF ACCESS | 20 |
| SERVER ID | - |
| CONTENTS URI | - |

FIG.10

| NAME OF CONTENTS | 30.mp3 | 44.mp3 |
|---|---|---|
| NUMBER OF ACCESS | 20 | - |
| SERVER ID | - | - |
| CONTENTS URI | - | - |

CONTENTS DELIVERY SYSTEM AND NETWORK SERVER

BACKGROUND OF THE INVENTION

1. Field of the Invention

The present invention relates to a contents delivery system and a network server, and more particularly, it relates to a contents delivery technique.

2. Description of the Related Art

Recently, there is known a contents delivery system which includes a network player, which can reproduce contents data (abbreviated as the contents hereinafter) such as a moving picture and an audio, and plural network servers, which are connected to the network player through a network. The network player and the network server support DLNA (Digital Living Network Alliance), and the network server includes a hard disk, which can record the contents, and a main computer, which has CPU to perform a control processing to control various units, and also transmits the contents in response to a contents acquisition requirement transmitted from the network player. The network player receives and reproduces the contents transmitted from the network server.

In delivering the contents to the network player, a conventional network server transmits the contents to the network player after ensuring a data transmission channel (hereinafter referred to as "connection") to the network player. The connection should be ensured depending on the number of the contents acquisition requirements, and a CPU load increases depending on the number of the connections to be ensured. Thus, when the contents acquisition requirements transmitted from the plural network players are concentrated in one network server, the CPU of the network server is heavily loaded, so that a wait state occurs in transmitting the contents, and a discontinuity and a delay often occur in reproducing the contents.

SUMMARY OF THE INVENTION

The present invention is to solve the problem described above, and an object of the present invention is to provide a contents delivery system and a network server which can prevent contents acquisition requirements transmitted from a network player(s) from concentrating in one network server.

According to a first aspect of the present invention, this object is achieved by a contents delivery system including a network player, which can reproduce contents such as a moving picture and an audio, and plural network servers, which are connected to the network player through a network.

The network player comprises a contents acquisition requirement transmission means for transmitting contents acquisition requirement to the network servers; and a contents reproduction means for reproducing contents.

At least one of the network servers comprises a contents transmission means for transmitting the contents to the network player in response to the contents acquisition requirement transmitted by the contents acquisition requirement transmission means, a recording medium in which the contents are recorded, and a control means including a CPU which performs a control processing to control various units in the at least one of the network servers.

The recording medium further records number of the contents acquisition requirements (abbreviated as the number of access hereinafter) per contents transmitted from the network player, a contents URI which indicates a link of the contents, to which the contents were copied, a network server identifier which is used to identify the network servers on the network, a threshold number of access which is a reference value to judge whether the contents are frequently accessed or not, and a CPU load threshold which is a reference value to judge whether the CPU is heavily loaded or not.

The at least one of the network servers further includes an access number judgement means for judging whether number of access to the contents exceeds the threshold number of access, a contents copy means for copying the contents to other network server on the network, a contents copy judgement means for judging whether there is the copy of the contents in any other network server on the network, and a CPU load judgement means for judging whether the load of the CPU exceeds the CPU load threshold.

The control means judges whether the number of access to the contents recorded in the recording medium exceeds the threshold number of access by the access number judgement means.

When the number of access is judged to exceed the threshold number of access, the control means copies the contents, which is accessed in excess of the threshold number of access, to the other network server by the contents copy means.

When receiving the contents acquisition requirement from the network player, the control means further judges whether the load of the CPU exceeds the CPU load threshold by the CPU load judgement means.

When the load of the CPU is judged to exceed the CPU load threshold, the control means further judges whether the contents which the network player requires to acquire were copied in any other network server on the network by the contents copy judgement means.

When the contents are judged to have been copied, the control means transmits the contents URI and the network server identifier to the network player after obtaining the contents URI and the network server identifier from the recording medium.

When receiving the contents URI and the network server identifier, the network player transmits the contents acquisition requirement to obtain the contents corresponding to the contents URI to the network server corresponding to the network server identifier.

With the above configuration, the network server copies the contents, which is accessed in excess of the threshold number of access, to the other network server on the network. Moreover, if the CPU load exceeds the CPU load threshold in receiving the contents acquisition requirements transmitted from the network player, the network server transmits the network server identifier for the network server, to which the contents were copied, and the contents URI, which indicates the link of the copied contents, to the network player. This system enables the network player to obtain the contents corresponding to the contents URI, which is received by the network player, from the network server corresponding to the network server identifier, which is received by the network player, so that this system can prevent the contents acquisition requirements from the network player from concentrating in one network server. Thus, the CPU load of the network server can be reduced to the threshold value or less, and the occurrence of the wait state in transmitting the contents in the network server can be prevented. Consequently, the network server can transmit the contents to the network player without the discontinuity and the delay.

The contents delivery system can include plural network players.

According to a second aspect of the present invention, this object is achieved by a network server which is connected to a network player, which can reproduce contents such as a moving picture and an audio, and other plural network server through a network.

The network server comprises a recording medium in which the contents are recorded, and a control means including a CPU which performs a control processing to control various units in the network server.

The recording medium further records number of the contents acquisition requirements (abbreviated as the number of access hereinafter) per contents transmitted from the network player, a contents URI which indicates a link of the contents, to which the contents were copied, a network server identifier which is used to identify the network servers on the network, and a threshold number of access which is a reference value to judge whether the contents are frequently accessed or not.

The network servers further includes an access number judgement means for judging whether number of access to the contents exceeds the threshold number of access, a contents copy means for copying the contents to other network server on the network, and a contents copy judgement means for judging whether there is the copy of the contents in any other network server on the network.

The control means judges whether the number of access to the contents recorded in the recording medium exceeds the threshold number of access by the access number judgement means, and when the number of access is judged to exceed the threshold number of access, the control means copies the contents, which is accessed in excess of the threshold number of access, to the other network server by the contents copy means.

When receiving the contents acquisition requirement from the network player, the control means further judges whether the contents which the network player requires to acquire were copied in any other network server on the network by the contents copy judgement means, and when the contents are judged to have been copied, the control means transmits the contents URI and the network server identifier to the network player after obtaining the contents URI and the network server identifier from the recording medium.

Preferably, the recording medium further records a CPU load threshold which is a reference value to judge whether the CPU is heavily loaded or not, therein the network server further includes a CPU load judgement means for judging whether the CPU load exceeds the CPU load threshold, and therein the network server judges whether the CPU load exceeds the CPU load threshold by the CPU load judgement means when receiving the contents acquisition requirement from the network player, and when the CPU load is judged to exceed the CPU load threshold, the control means judges whether the contents which the network player requires to acquire were copied to any of the network server on the network, and when the contents are judged to have been copied, the control means obtains the contents URI and the network server identifier from the recording medium and transmits the contents URI and the network server identifier to the network player.

While the novel features of the present invention are set forth in the appended claims, the present invention will be better understood from the following detailed description taken in conjunction with the drawings.

BRIEF DESCRIPTION OF THE DRAWINGS

The present invention will be described below with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
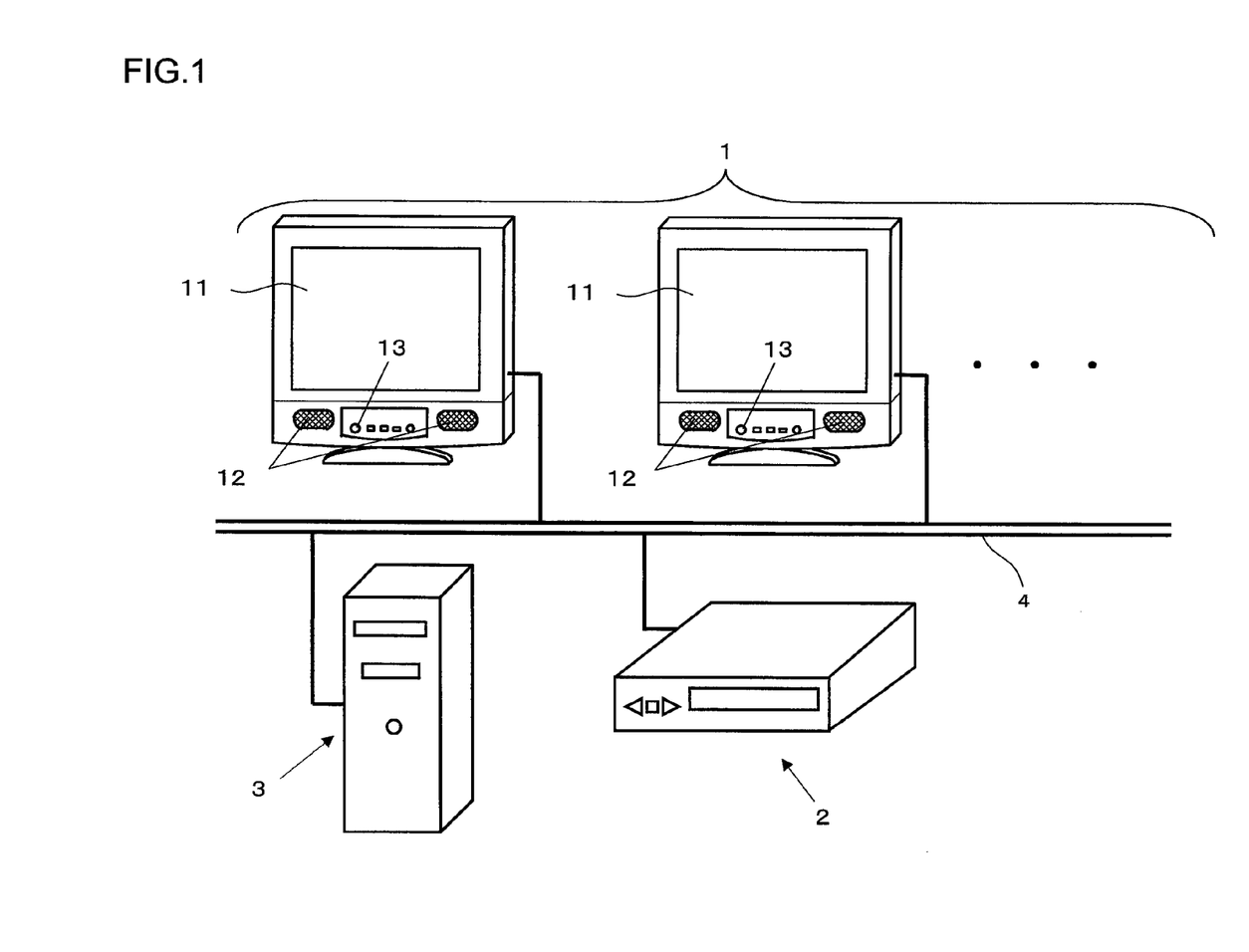
FIG. 1 is a schematic diagram showing a contents delivery system including a network player and a network server according to a preferred embodiment of the present invention.

A preferred embodiment according to the present invention is described below with reference to FIGS. 1 to 3. FIG. 1 shows a contents delivery system including plural network players 1 which can reproduce contents data (abbreviated as the contents hereinafter) such as a moving picture and an audio, and plural network servers 2 and 3 which are connected to the network players 1 through a network 4. The network player 1 and the network servers 2 and 3 support DLNA (Digital Living Network Alliance), so that a DLNA-compliance equipment can easily be added to or deleted from the network 4.

Figure 2:
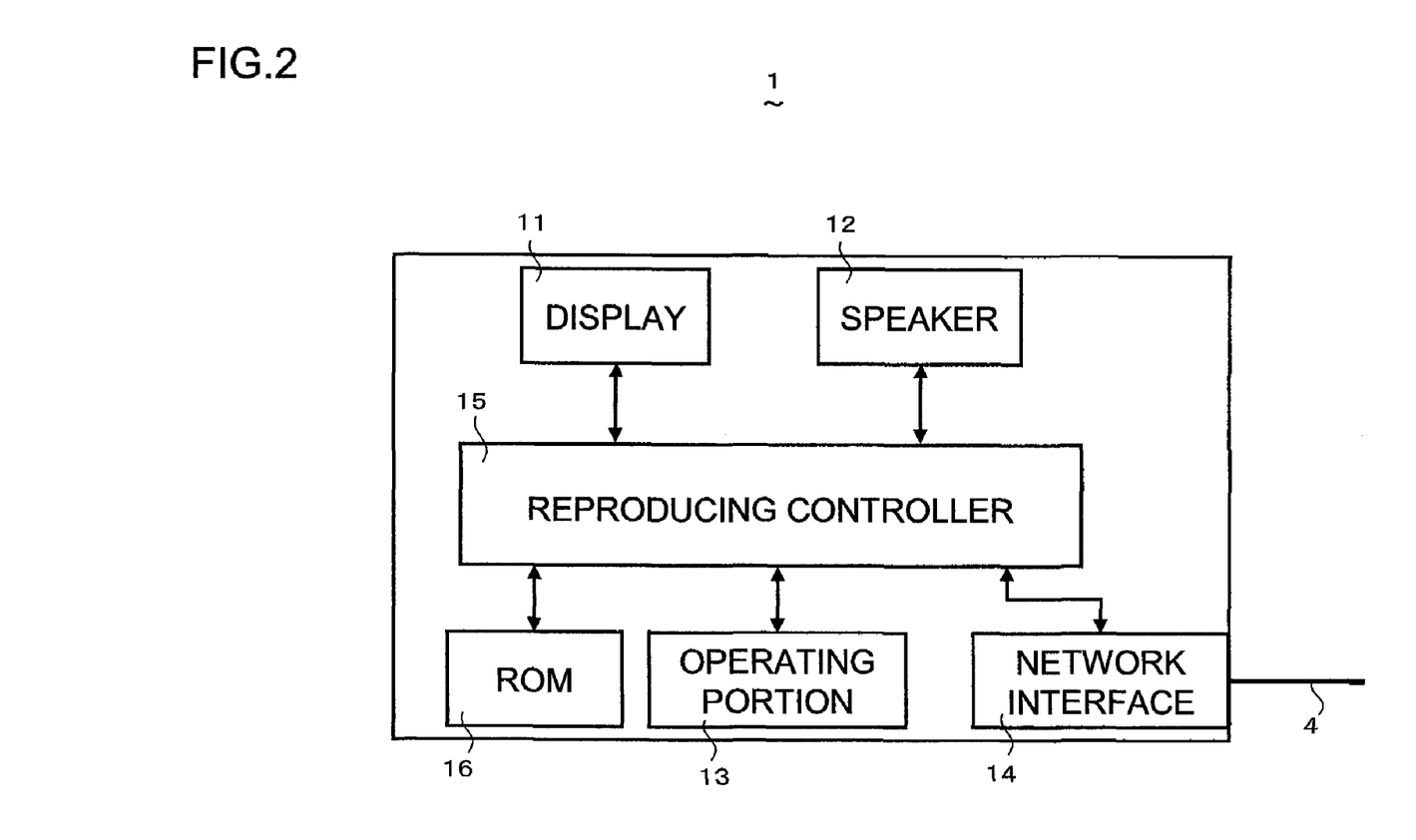
FIG. 2 is a block diagram showing an internal configuration of the network player in FIG. 1.
Figure 3:
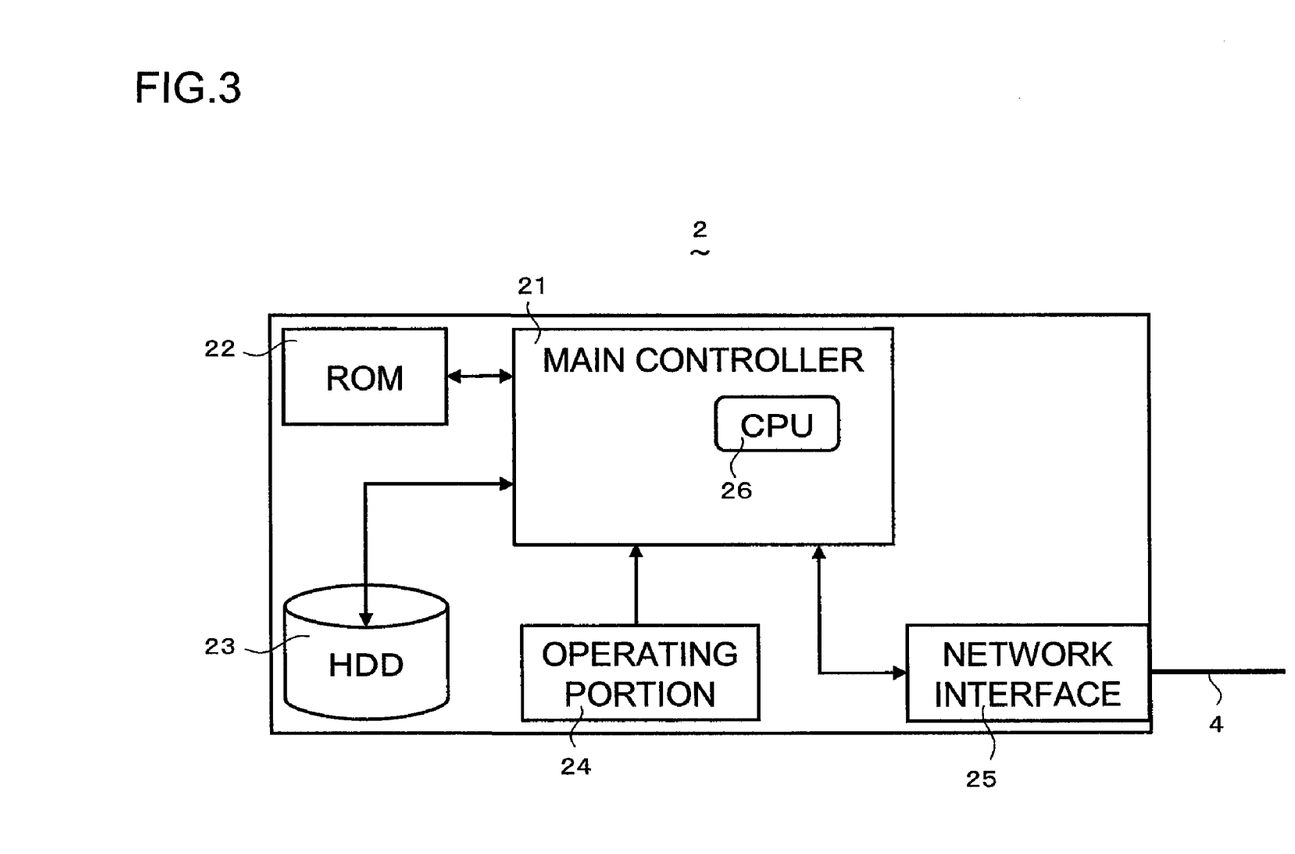
FIG. 3 is a block diagram showing an internal configuration of the network server in FIG. 1.

FIG. 2 shows an internal configuration of the network player 1. FIG. 3 shows an internal configuration of the network server 2. An internal configuration of the network server 3 is similar to that of the network server 2, so that the network server 3 can perform the processing similar to the processing which the network server 2 performs.

The network player 1 includes a network interface 14 (means for transmitting the contents acquisition requirement) which transmits a contents acquisition requirement to the network servers 2 and 3 and also receives contents from the network servers 2 and 3, an operating portion 13 which has buttons to be operated by a user, a reproducing controller 15 (reproducing means) which reproduces the contents and controls various units, and a ROM 16 which stores operating programs of the reproducing controller 15. The network player 1 further includes a display 11 which outputs contents of moving pictures, images, and so on received by the network interface 14 and a speaker 12 which outputs audios based on audio signals outputted from the reproducing controller 15.

The network server 2 includes a hard disk 23 (abbreviated as the HDD hereinafter) in which the contents are recorded, an operating portion 24 which is operated by the user, a network interface 25 (transmission means) which receives the contents acquisition requirement transmitted from the network players 1 and also transmits the contents in response to the contents acquisition requirement received by the network interface 25, a main controller 21 (control means) which has a CPU 26 to perform a control processing to control various units, and a ROM 22 which stores operating programs of the main controller 21.

The HDD 23 further records number of the contents acquisition requirements (abbreviated as the number of access hereinafter) per contents transmitted from the network player(s) 1, a contents URI which indicates a link of copied contents, a server ID (network server identifier) which is used to identify the network servers 2 and 3 on the network 4, a threshold number of access to the contents, and a CPU load threshold The threshold number of access is a reference value to judge whether the contents are frequently accessed, and when the threshold number of access is "50" and the number of access to the contents is "51", for example, the contents are judged to be accessed frequently. Besides, any value can be set as the threshold number of access. The CPU load threshold is a reference value to judge whether the CPU is heavily loaded or not, and in judging the CPU load based on a CPU utilization, for example, when the CPU load threshold is "80" percent and the CPU utilization is "90" percent, the CPU is judged to be heavily loaded. Besides, the CPU load threshold can be set corresponding to various kinds of data. For example, the number of connection can be set as an equivalent of the CPU load, When the CPU load threshold is "10" and the number of connection is "11", the CPU can be judged to be heavily loaded.

The network interface 25 transmits the contents URI and the server ID to the network players 1 in addition to the contents recorded in the HDD 23.

The main controller 21 functions as a means for judging the number of access, as a means for copying the contents, as a means for judging the copy of the contents, and as a means for detecting the state of the CPU load. The main controller 21 also searches the contents in response to the contents acquisition requirements transmitted from the network players 1, records the contents URI, the server ID, and so on in the HDD 23, and so on.

Next, a procedure of a processing in one of the network players 1 (hereafter referred to simply as "the network player 1") to require the contents acquisition to the network server 2 is described with reference to FIG. 4. First, when the network player 1 transmits a contents acquisition requirement to the network server 2 (S1), the main controller 21 in the network server 2 receives the contents acquisition requirement and performs a response processing of the network server (S2), and the network player 1 receives data from the network server 2 (S3). A detail of the response processing of the network server is described below.

When the data which the network player 1 receives in the S3 are the contents (YES in S4), the reproducing controller 15 in the network player 1 receives and reproduces the contents. In contrast, when the data which the network player 1 receives in the S3 are not the contents in the S3 (NO in S4), the data transmitted from the network server 2 include the contents URI and the server ID, so that the network player 1 which receives the above data transmits the contents acquisition requirement, which is to obtain the contents corresponding to the contents URI, to the network server corresponding to the server ID (S6), and subsequently repeats the processing following the S2.

Figure 4:
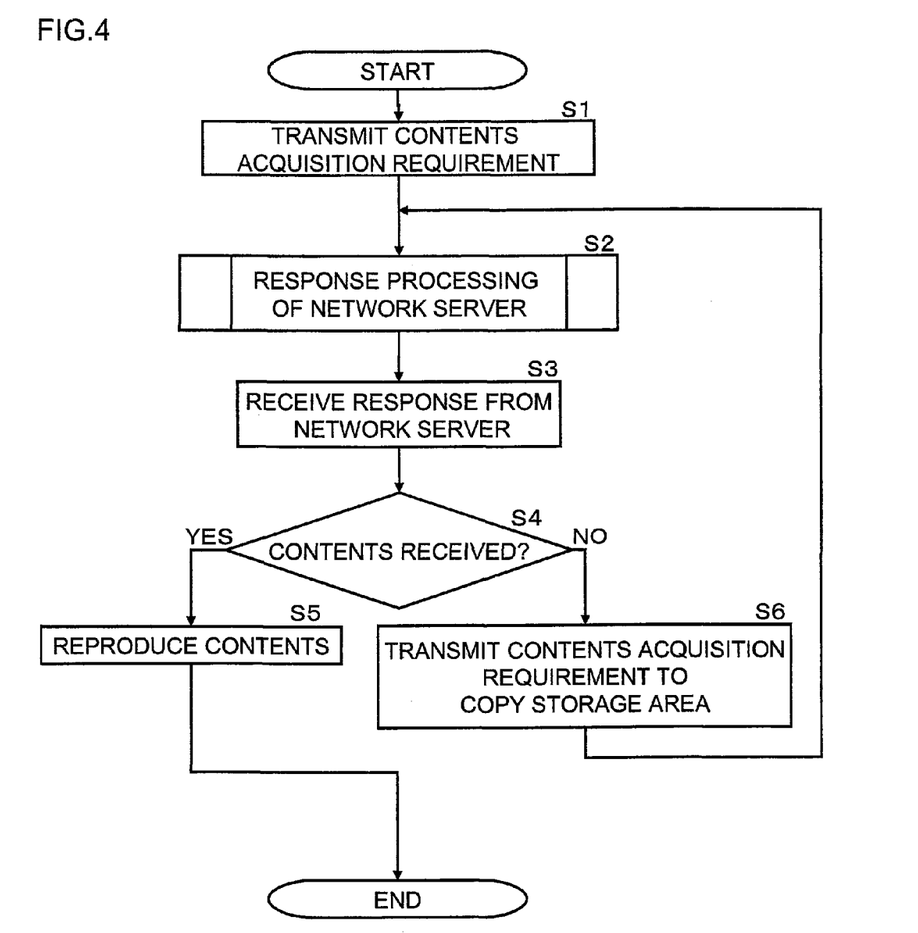
FIG. 4 is a flow chart showing a processing of the network player in FIG. 1 to transmit a contents acquisition requirement.
Figure 5:
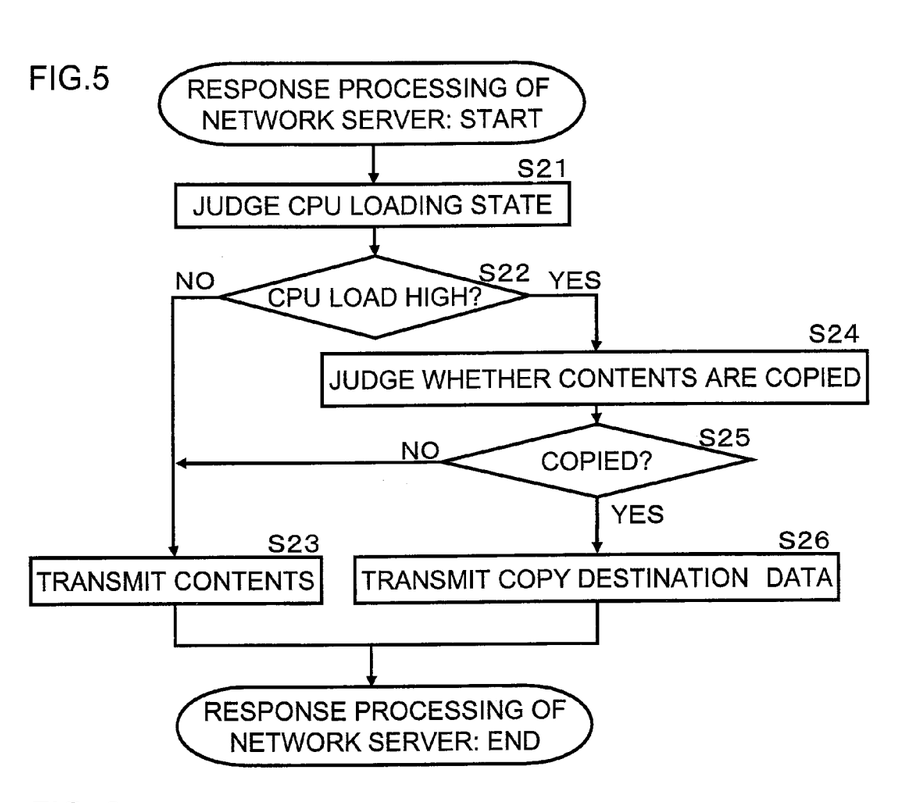
FIG. 5 is a flow chart showing a response processing of network server in the network server in FIG. 1.

Next, the detail of the response processing of the network server in FIG. 4 is described with reference to FIG. 5. The main controller 21 in the network server 2 detects a load of the CPU 26 and judges whether the load of the CPU 26 exceeds a CPU load threshold (S21). When the load of the CPU 26 is judged to be below the CPU load threshold (NO in S22), the main controller 21 transmits the contents to the network player 1 in response to the contents acquisition requirement transmitted from the network player 1 (S23).

In contrast, when the load of the CPU 26 is judged in the S21 to exceed the CPU load threshold (YES in S22), the main controller 21 judges whether the contents which the network player 1 requires to acquire were copied to any of the network servers on the network 4 (S24). When the contents are judged to have been copied (YES in S25), the main controller 21 obtains the contents URI and the server ID (copy destination data) from the HDD 23 and subsequently transmits the copy destination data to the network player 1 (S26).

As described above, according to the network server 2 of the present preferred embodiment, when the contents acquisition requirement is transmitted from the network player 1, the loading state of the CPU 26 is judged. When the load of the CPU 26 is judged to exceed the CPU load threshold, the main controller 21 can receive the contents URI and the server ID from the HDD 23 and subsequently, transmit these data to the network player 1. According to the processing described above, the load of the CPU 26 can be reduced to the CPU load threshold or less, so that an occurrence of a wait state in transmitting the contents in the network server 2 can be prevented. Consequently, the network server 2 can transmit the contents to the network player 1 without a discontinuity and a delay.

In contrast, when the contents were not copied in the S24 (NO in S25), the main controller 21 performs the processing of the S23 and completes the response processing of the network server.

Figure 6:
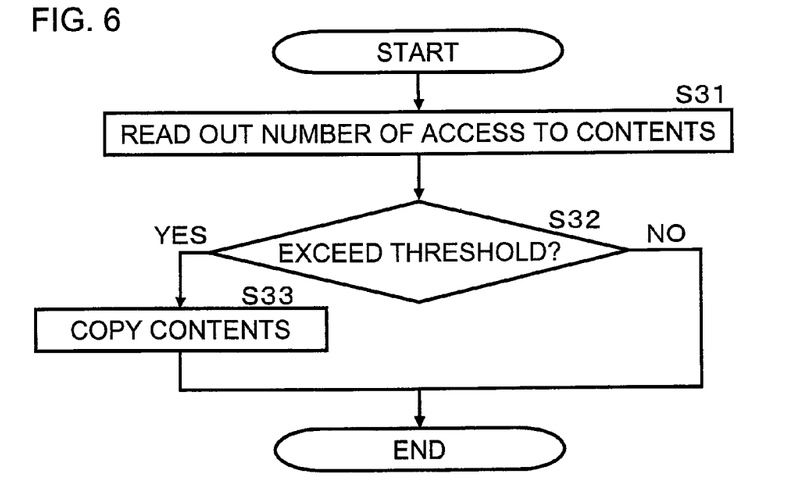
FIG. 6 is a flow chart showing a processing to copy the contents in the network server in FIG. 1.

Next, a procedure of a processing in the main controller 21 to copy the contents to the other network server is described with reference to FIG. 6. The main controller 21 reads out the number of access to the contents from the HDD 23 (S31), and judges whether the number of access to the contents exceeds the threshold number of access (S31). When the number of access is judged to exceed the threshold (YES in S32), the main controller 21 copies the contents which are accessed in excess of the threshold number of access, to the other network server on the network 4 (S33), and subsequently, records the contents URI and the server ID corresponding to the network server, to which the contents were copied, in the HDD 23 and completes the processing. In contrast, when the number of access is judged to be below the threshold (NO in S32), the main controller 21 completes the processing without performing the processing of the S33. In the S33, TCP/IP protocol suite including HTTP (Hyper Text Transfer Protocol), FTP (File Transfer Protocol) and the like, which supports DLNA, is used when the network server 2 copies the contents. The timing for the network server 2 to copy the contents is not limited at the time immediately after the number of access to the contents exceeds the threshold number of access. For example, the timing may be whenever the load of the network server to which the contents were copied is low.

Figure 7:
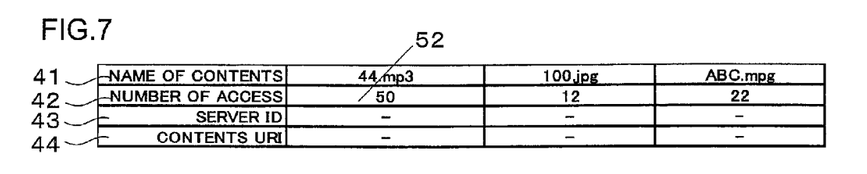
FIG. 7 is an explanatory diagram showing an example of contents data stored in the network server in FIG. 1.
Figure 8:
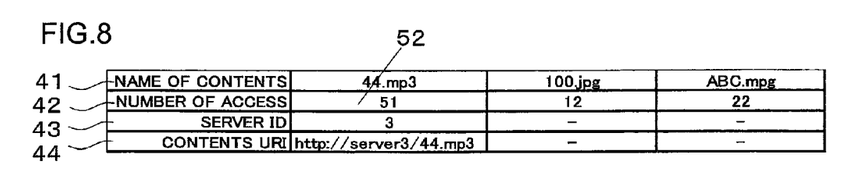
FIG. 8 is an explanatory diagram showing an example of contents data stored in the network server in FIG. 1.
Figure 9:
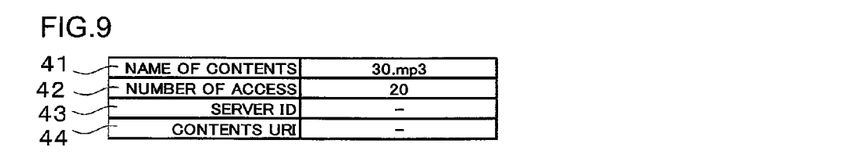
FIG. 9 is an explanatory diagram showing an example of contents data stored in another network server.
Figure 10:
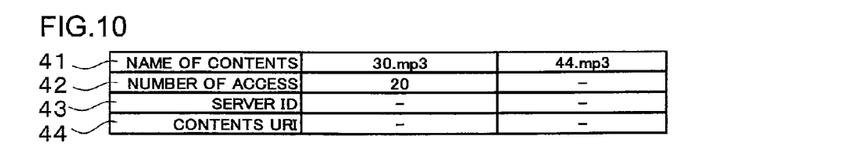
FIG. 10 is an explanatory diagram showing an example of contents data stored in another network server.

Next, respective data on the contents recorded in the HDD 23 are described with reference to FIGS. 7 to 10. The contents data in FIGS. 7 to 10 include a name of contents 41, a number of access 42, a server ID 43, and a contents URI 44. FIG. 7 shows contents data recorded in the HDD 23 in the network server 2 before the processing to copy the contents shown in FIG. 6. FIG. 10 shows contents data recorded in the HDD 23 in the network server 2 after the processing to copy the contents shown in FIG. 6. FIG. 9 shows contents data recorded in the HDD 23 in the network server 3 before the processing to copy the contents shown in FIG. 6. FIG. 8 shows contents data recorded in the HDD 23 in the network server 3 after the processing to copy the contents shown in FIG. 6.

Assume that the number of access to the contents named "44.mp3" is "50" as shown in a column 52 in FIG. 7, when the threshold number of access of the network server 2 is "50". When the main controller 21 in the network server 2 receives an acquisition requirement of "44.mp3" from the network player 1, the number of access of "44.mp3" becomes "51" and thereby exceeds the threshold number of access. At this time, the main controller 21 performs the processing shown in FIG. 6 and copies "44.mp3". When the main controller 21 in the network server 2 copies "44.mp3" to the HDD 23 in the network server 3, the contents data of "44.mp3" recorded in the HDD 23 in the network server 2 includes the number of access "51", the server ID "3", and the contents URI "http://server3/44.mp3" after copied, as shown in a column 52 in FIG. 8. The server ID of the network server 3 is "3" in FIG. 8, however, any value is applicable without limitation. Moreover, the network server 2 can copy the "44.mp3" to any other network server on the network 4.

Assume that the HDD 23 in the network server 2 records the contents data shown in FIG. 8 after the network server 2 copies "44.mp3" to the network server 3. If the CPU 26 in the network server 2 is heavily loaded at the time the network player 1 performs the acquisition requirement of "44.mp3" to the network server 2, the main controller 21 in the network server 2 transmits the server ID "3" and the contents URI "http://server3/44.mp3" to the network player 1 instead of the contents of "44.mp3". Upon receiving them, the network player 1 transmits the contents acquisition requirement to obtain the contents corresponding to the contents URI "http://server3/44.mp3" to the network server 3 corresponding to the server ID "3". The network server 3 transmits "44.mp3" to the network player 1, and upon receiving it, the network player 1 reproduces "44.mp3".

Before the network server 2 copies "44.mp3" to the network server 3, the contents data recorded in the HDD 23 in the network server 3 do not include the data of "44.mp3" as shown in FIG. 9. After the network server 2 copies "44.mp3" to the network server 3, the contents data recorded in the HDD 23 in the network server 3 include the data of "44.mp3" as shown in FIG. 10.

As described above, according to the network server 2 of the present preferred embodiment, the network server 2 copies the contents, which are accessed in excess of the threshold number of access, to the other network server on the network 4. And moreover, if the load of the CPU 26 exceeds the CPU load threshold when receiving the contents acquisition requirement from the network player 1, the network server 2 transmits the contents URI and the server ID corresponding to the network servers, to which the contents were copied, to the network player 1. This contents delivery system enables the network player 1 to obtain the contents corresponding to the contents URI, which is received by the network server 2, from the network server 3 corresponding to the server ID, which is received by the network player 1, so that this system can prevent the contents acquisition requirements from the network players 1 from concentrating in one network server. Thus, the CPU load of the network server 2 can be reduced to the threshold value or less, and the occurrence of the wait state in transmitting the contents in the network server 2 can be prevented. Consequently, the network server 2 can transmit the contents to the network player 1 without the discontinuity and the delay.

Moreover, the load of the CPU 26 can be reduced to the threshold value or less, so that even in transmitting the contents to the network player 1 while the heavily-loaded processing, which includes the record of the contents in the HDD 23 or the like, is performed, the network server 2 can transmit the contents to the network player 1 without the discontinuity and the delay.

The present invention is not limited to the composition of the preferred embodiment described above, however, various modifications are applicable without departing from the scope of the present invention. For example, the network server which transmits the contents can also reproduce the contents.

What is claimed is:

1. A contents delivery system including a network player, which reproduces contents including a moving picture and an audio, and plural network servers, which are connected to the network player through a network,
   wherein the network player comprises:
   a contents acquisition requirement transmission means for transmitting a contents acquisition requirement to the network servers; and
   a contents reproduction means for reproducing the contents, and
   wherein at least one of the network servers comprises:
   a contents transmission means for transmitting the contents to the network player in response to the contents acquisition requirement transmitted by the contents acquisition requirement transmission means;
   a recording medium in which the contents are recorded, and
   a control means including a CPU which performs a control processing to control various units in the at least one of the network servers,
   wherein the recording medium further records:
   a number of accesses of the contents acquisition requirements per contents transmitted from the network player;
   a contents URI which indicates a link of the contents, to which the contents were copied;
   a network server identifier that identifies the network servers on the network;
   a threshold number of accesses which is a reference value to judge whether the contents are frequently accessed or not; and
   a CPU load threshold which is a reference value to judge whether the CPU is heavily loaded or not,
   wherein the at least one of the network servers further includes:
   an access number judgment means for judging whether number of accesses to the contents exceeds the threshold number of accesses;
   a contents copy means for copying the contents to other network server on the network;
   a contents copy judgment means for judging whether the copy of the contents exists in any other network server on the network; and
   a CPU load judgment means for judging whether utilization of the CPU exceeds the CPU load threshold,
   wherein the control means judges whether the number of accesses to the contents recorded in the recording medium exceeds the threshold number of accesses by the access number judgment means,
   wherein, when the number of accesses is judged to exceed the threshold number of accesses, the control means copies the contents, which is accessed in excess of the threshold number of accesses, to the other network server by the contents copy means,
   wherein, when receiving the contents acquisition requirement from the network player, the control means further judges whether the utilization of the CPU exceeds the CPU load threshold by the CPU load judgment means, wherein, when the utilization of the CPU is judged to exceed the CPU load threshold, the control means further judges whether the contents in the contents acquisition requirement were copied in any other network server on the network by the contents copy judgment means, wherein, when the contents are judged to have been copied, the control means transmits the contents URI and the network server identifier to the network player after obtaining the contents URI and the network server identifier from the recording medium, and wherein, when receiving the contents URI and the network server identifier, the network player transmits the contents acquisition requirement to obtain the contents corresponding to the contents URI to the network server corresponding to the network server identifier.

2. The contents delivery system according to claim 1, wherein the contents delivery system includes plural network players.

3. A network server which is connected to a network player, which reproduces contents including a moving picture and an audio, and other plural network server through a network, comprising:

a recording medium in which the contents are recorded, and a control means including a CPU which performs a control processing to control various units in the network server, wherein the recording medium further records:

a number of accesses of the contents acquisition requirements per contents transmitted from the network player;

a contents URI, which indicates a link of the contents, to which the contents were copied;

a network server identifier that identifies the network servers on the network;

a threshold number of access, which is a reference value to judge whether the contents are frequently accessed or not; and a CPU load threshold which is a reference value to judge whether the CPU is heavily loaded or not, wherein the network servers further include:

an access number judgment means for judging whether a number of accesses to the contents exceeds the threshold number of accesses;

a contents copy means for copying the contents to other network servers on the network;

a contents copy judgment means for judging whether the copy of the contents exists in any other network server on the network; and a CPU load judgment means for judging whether utilization of the CPU exceeds the CPU load threshold, wherein the control means judges whether the number of accesses to the contents recorded in the recording medium exceeds the threshold number of accesses by the access number judgment means, and when the number of accesses is judged to exceed the threshold number of accesses, the control means copies the contents, which is accessed in excess of the threshold number of accesses, to the other network server by the contents copy means, and wherein the network server judges whether the utilization of the CPU exceeds the CPU load threshold by the CPU load judgment means when receiving the contents acquisition requirement from the network player, and when the utilization of the CPU is judged to exceed the CPU load threshold, the control means judges whether the contents in the contents acquisition requirement were copied to any of the network servers on the network, and when the contents are judged to have been copied, the control means obtains the contents URI and the network server identifier from the recording medium and transmits the contents URI and the network server identifier to the network player.

4. The network server according to claim 3, wherein the network server is connected to plural network players.

* * * * *